United States Patent
Bergh et al.

(10) Patent No.: US 6,932,766 B2
(45) Date of Patent: Aug. 23, 2005

(54) SATIETY METER

(75) Inventors: Cecilia Bergh, Stockholm (SE); Per Södersten, Stockholm (SE); Michel Zandian, Stockholm (SE)

(73) Assignee: Mandometer AB, Huddinge (SE)

( * ) Notice: Subject to any disclaimer, the term of this patent is extended or adjusted under 35 U.S.C. 154(b) by 187 days.

(21) Appl. No.: 10/625,966

(22) Filed: Jul. 23, 2003

(65) Prior Publication Data

US 2005/0008993 A1 Jan. 13, 2005

(30) Foreign Application Priority Data

Jul. 7, 2003 (SE) .......................................... 0301997-3

(51) Int. Cl.⁷ ............................................. A61B 5/00
(52) U.S. Cl. ....................................... 600/300; 128/921
(58) Field of Search ................................ 600/300–301, 600/595; 128/898, 920, 921; 434/236–238, 127

(56) References Cited

U.S. PATENT DOCUMENTS

| | | | | |
|---|---|---|---|---|
| 5,412,560 A | * | 5/1995 | Dennison | 600/300 |
| 6,558,165 B1 | * | 5/2003 | Curry et al. | 434/236 |
| 6,635,015 B2 | * | 10/2003 | Sagel | 600/300 |

FOREIGN PATENT DOCUMENTS

EP 0 794 727 8/2003

OTHER PUBLICATIONS

Bergh, et al., ""Randomized controlled trial of a treatment for anorexia and bulimia nervosa," *Proceedings of the National Academy of Science (PNAS)*," pp. 9486–9491, Jul. 9, 2002.

Bergh, et al., "A new treatment of anorexia nervosa," *The Lancet*, vol. 348(9027):611–612, 1996.

Holland, et al., "Measurement of Excessive Appetite and Metabolic Changes in Prader–Willi Syndrome," *International Journal of Obesity*, 17(9):527–532, 1993.

Borg, "A Category Scale With Ratio Properties for Intermodal and Interindividual Comparisons," *In Psychophysical Judgment and the process of Perception*, International Congress of Psychology, Edited by H.-G. Beissler and P. Petzold, North–Holland, pp. 25–34 (1982).

* cited by examiner

*Primary Examiner*—Max F. Hindenburg
*Assistant Examiner*—Michael Astorino
(74) *Attorney, Agent, or Firm*—Dean W. Russell; Kilpatrick Stockton LLP

(57) ABSTRACT

The invention relates to a computerized handheld substantially pocket size device (10) for satiety registering and satiety response and a method therefore. It is utilized in aiding a person, in a controlled manner, to appreciate when to eat, comprising in-/output means (12, 16), electronic memory, a display screen (14) and a modified Borg type scale (18) for rating of satiety.

12 Claims, 3 Drawing Sheets

SATIETY METER

This application claims priority to Swedish Patent Application No. 0301997-3 filed on Jul. 7, 2003, the entire contents of which are incorporated herein by reference.

1. Technical Field

The present invention pertains to a computerized handheld device, substantially pocket sized, registering fullness and responding to fullness, utilized for aiding a person in a controlled manner to appreciate when to eat, and a method therefore.

2. Background Art

By necessity a person has to eat in order to feel well and to be able to cope with every day duties. Changed eating behavior following increasing demands to perform well in various areas of business, sports, school etc., and social situations involving for instance unemployment or illness has made the society and healthcare aware of several forms of severe, when not almost immediately treated, eating disorders. Such disorders are for example obesity, gastrointestinal, anorexia, bulimia nervosa and others.

When a person has developed what could be regarded as an eating disorder such as for instance obesity it is very hard to reach back to normal eating behaviors. An obese person treated in line with current methods for relieving obesity is almost certain to be put under heavy dieting similar to starving. Such dieting may very well lead to a weight loss of 5 kg per month or more. Far from all obese persons can tolerate to be put under such strain for longer periods, and those who do often fall back to their initial eating behavior and start to gain weight.

Scientists in the field of research relating to eating behaviors are astonished when they interview people, not only obese, with eating disorders that those interviewed are unable to feel satiety or fullness, i.e., the mechanism of being able to determine or feel satiety is disabled. Hence, it is of importance to teach or train a person having an eating disorder to regain the skill of feeling fullness.

In 1982, Borg performed psychophysical studies of the subjective estimation of workload, Borg G. 1982, "A category scale with ratio properties for intermodal and individual comparisons", In: Greissler H-G, Petzold Y M (eds): "psychophysical Judgment and the process of perception", pp 25–34, Springer Verlag: Berlin. Borg construed a scale that generates data on the level of an intervals scale with equal steps.

Bergh and Södersten introduced a modified Borg type scale in their patent EP 0794 727 largely corresponding to U.S. Pat. No. 5,817,006 to Bergh et al, but added unequal or narrower steps in order to be able to quantify parts of the scale with a finer resolution. In these patents, the Borg type scale is used to quantify satiety correlatively to eating rate so that a test person can practice eating at a conventional rate. A conventional meal or lunch should take approximately 12–15 minutes.

The Bergh et al research within the field of eating disorders has been published by Proceedings of The National Academy of Science (PNAS), "Randomized controlled trial of a treatment for anorexia and bulimia nervosa", pp 9486–9491, Jul. 9, 2002, and in The Lancet, "A new treatment of anorexia nervosa", vol. 348, No. 9027, pp. 611–612, 1996.

It is known to persons skilled in the art that the gastrointestinal hormone cholecystokinin (CCK) is a determinant of satiety such that its pattern of secretion and the level of deprivation of food affect the rate of eating to become negatively accelerated and the experience of satiety positively accelerated with an increase in deprivation. This is true for healthy people, but not necessarily for those who have developed an eating disorder.

An example of an eating disorder where a person does not respond to satiety in accordance with the level of CCK is provided in Holland et al in 'Measurement of Excessive Appetite and Metabolic Changes in Prader-Willi Syndrome', International Journal of Obesity, 17, No. 9, 1993, pages 527–532, is based on a measurement, in a group of patients with the Prader-Willi Syndrome (PWS, excessive food intake), and a control group without eating disorders to register feelings of hunger. Both groups where consuming sandwiches and juice. Feelings of hunger were measured through an analogue scale and blood was taken for estimation of for instance CCK. The PWS group had high levels of CCK in their blood, but still they had hunger feelings. PWS has a pathological or genetic cause.

SUMMARY OF THE INVENTION

The present invention aims to aid and help people by an arrangement that provides a token of satiety or fullness. Some of these may eventually regain their skills of feeling satiety thus being free to dispose the arrangement, and others may have learnt to use the arrangement as a safeguard for a controlled dieting. It is emphasized that the arrangement of the present invention also could be utilized by persons regarded as healthy in order to keep a proper diet, thus for instance athletes could gain from utilizing the device as they have to keep a strict diet before a competition or sport event. Healthy persons with a body mass index (BMI) close to an upper value of a BMI limit are another example of a group that can use the arrangement to keep fit.

To solve problems and achieve the aims and goals of the present invention it sets forth a computerized handheld substantially pocket size device registering fullness and responding to fullness, utilized for aiding a person, in a controlled manner, to appreciate when to eat, comprising in-/output means, electronic memory, and a display screen. The invention thus comprises:

a Borg type scale representing ratings of fullness on the screen;

a means for alerting the person to register through the input means here/his felt fullness on the scale in a predetermined numbers of intervals following a food-intake; and at least one of an indicating and an alerting means acknowledging when food-intake is accepted for the person, thus aiding the person in a smooth long term dieting contradicting extreme excessive short term dieting.

An embodiment of the present invention comprises that the scale at least partially is partitioned in incremental steps linguistically expressed in terms ranging from approximately no fullness to a maximum of fullness or in terms equivalent to those.

In one embodiment of the present invention, the device is used to register felt fullness during a meal.

Another embodiment comprises that the indicating means has a floating color scale within the Borg type scale indicating from less brighter colors to brighter colors after registering a felt fullness when eating is more and more recommended.

One embodiment comprises that the indicating means has a floating color scale within the Borg type scale indicating from brighter colors to less brighter colors after registering a felt fullness, when eating is more and more recommended.

A further embodiment comprises that the indicating means is a floating color scale within the Borg type scale indicating from less brighter colors to brighter colors after registering a felt fullness, and a switch switching at a predetermined brightness to a floating color scale within the Borg type scale indicating from brighter colors to less brighter colors after registering a felt fullness, when eating is more and more recommended.

A still further embodiment provides that the alerting means generates a vibration to the device due to the right to privacy of the person tying to cure a disorder.

In addition the present invention sets forth a method for satiety registering and response to satiety utilizing a computerized handheld substantially pocket size device in aiding a person, in a controlled manner, to appreciate when to eat, comprising in-/output means, electronic memory, and a display screen. The method further comprises:

employing a modified Borg type scale representing ratings of satiety said screen;

alerting said person to register through said input means felt satiety on said scale in a predetermined number of intervals following a food-intake; and at least one of indicating and alerting when food-intake is acknowledged for said person, thus aiding said person in a smooth long term dieting contradicting extreme excessive short term dieting.

BRIEF DESCRIPTION OF THE DRAWINGS

Henceforth reference is had to the accompanying drawings for a better understanding of the present invention with its given examples and preferred embodiments, wherein.

DETAILED DESCRIPTION OF PREFERRED EMBODIMENTS

Figure 1:
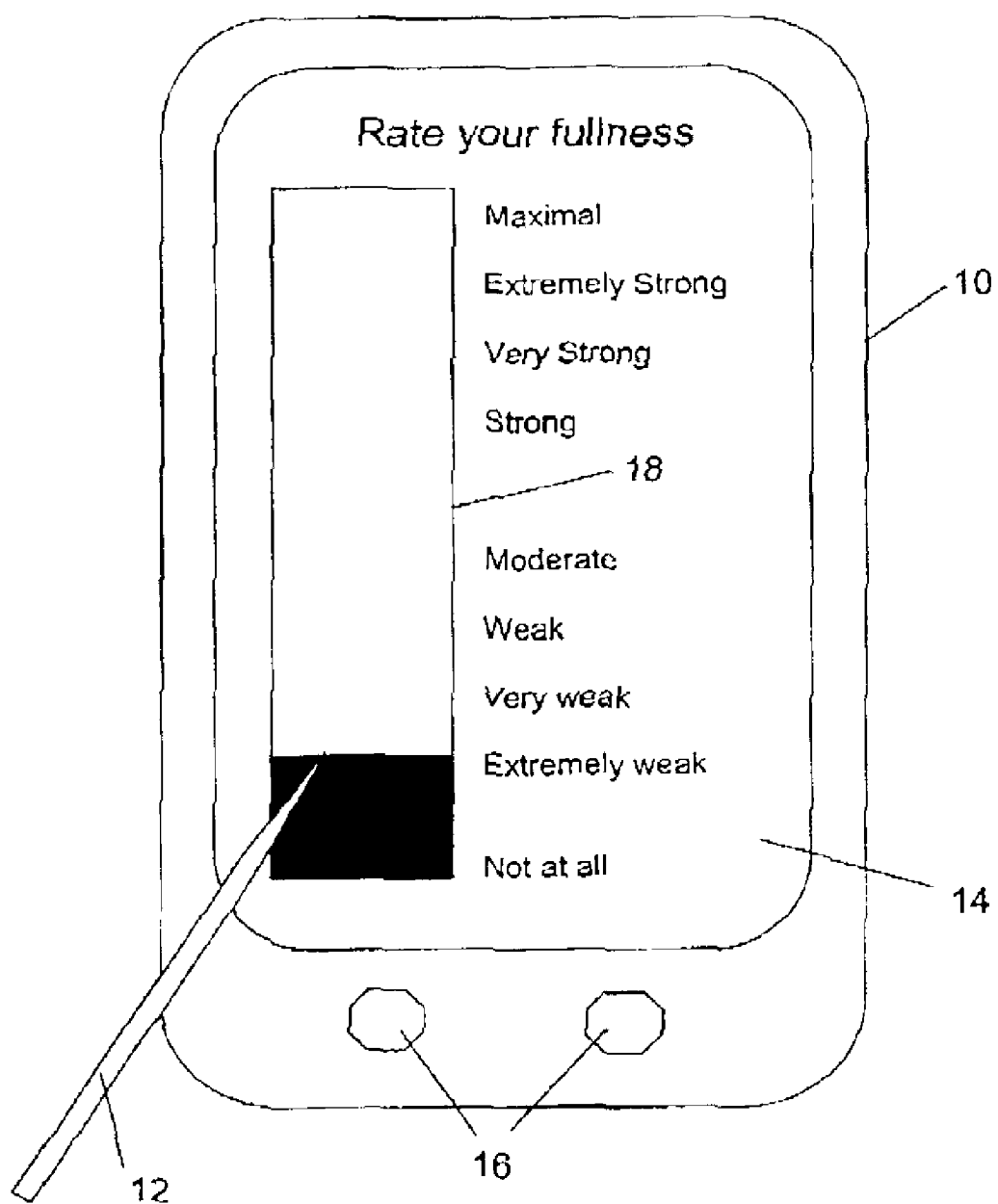
FIG. 1 schematically illustrates a computerized device displaying a scale utilized in accordance with the present invention.

The obese are typically motivated to eat, even though they are not hungry, because they fear that they may soon be in a situation where they will not be able to obtain food. They also report being hungry all of the time when they try to lose weight. These two factors doom most attempts at treatment.

The present invention provides a device (working name SatietyMeter) that aids people to learn, remember their satiety, or practice how to feel fullness or satiety, so that they can live a comfortable life or suppress or cure a prevailing eating disorder. In doing so it sets forth a preferably pocket sized computerized Personal Digital Assistant (PDA) or the like, FIG. 1. The PDA is a conventional device 10 having a pointer means 12 for manipulation of functions, in-/output and the like shown on a display screen 14, and possibly equipped with buttons 16 for in-/output or a keypad.

To provide the device for remembering or teaching satiety to persons that need such a feature, the device 10 comprises specific software residing in the device 10 electronic memory space. This software or computer program creates a scale 18 on the display 14. The scale 18 is a type of modified Borg scale 18 preferably divided in even steps of for instance 0.0 to 100 incremented in steps of 0.1 (1/10), or other suitable scale steps for performing the specific task. To guide a person who uses the device 10, the scale 18 is highlighted, at specific locations of it, with prompting text for input of felt satiety by a person.

The prompting text, in one embodiment suggests, for example, "Rate your fullness", and levels in the scale from 0.0 to 100 are identifying ratings of fullness such as for instance not at all, extremely weak, very weak, weak, moderate, strong, very strong, extremely strong, and maximal fullness, see FIG. 1. It is appreciated that other wordings may be used, but the underlying principle prevails. Also, in a simple embodiment, the scale 18 could be provided with its numerical rating values, for example, 0,0; 0,1; 0,2 . . . 99,8; 99,9; 100 or the like. The scale 18 may also have other ranges and division of scale steps including narrower steps for specific ratings as for instance in the moderate region or any other suitable region as obvious for a person skilled in the art. Although the scale 18 is depicted as a pile in FIG. 1, it could as well be presented as any other suitable graphic such as a circular pie diagram, serpentine, a person graphic, animals, plants, houses and other. There are unlimited varieties of graphics that can be used to represent the scale 18, and it should be kept in mind that they can provide extra joy to children using the device.

It should be noted that the concept of rating satiety or fullness could in one embodiment of the present invention as well be changed to a rating of feeling hunger.

While conducting clinical tests, further elucidated below, on obese children it turned out that they quickly embraced the device and enjoyed using it. This notion is important as there are severe health problems related to obesity in children as it is not unusual that a child, not even ten years old, can weigh more than 100 kg.

The device 10 in one embodiment is equipped with a card receiver and slot (not shown), whereby recordings of satiety for a later evaluation can be stored on the card. It is also possible to store recorded information in a stationary device 10 memory.

A possible session for a person to register a satiety rating after a meal could have duration of two hours, whereby the person would be asked, for example, once every 15 minutes, seven rating attempts, to register satiety. The device 10 alerts the person every 15 minutes through a sound or preferably by vibrations that it is time to register satiety. Clinical tests as mentioned showed that persons using the device 10 found it embarrassing that others had knowledge of what was going on due to sounds that alerted the person, and thus rather preferred to register ratings in privacy which can be achieved when accomplishing alerting through vibrations.

On the display screen 14 the scale 18 pops up when a registration is alerted and the user points with the pointing means 12 on the scale 18 displayed on the display screen 14 to register the felt satiety at the actual time after a meal.

Figure 2:
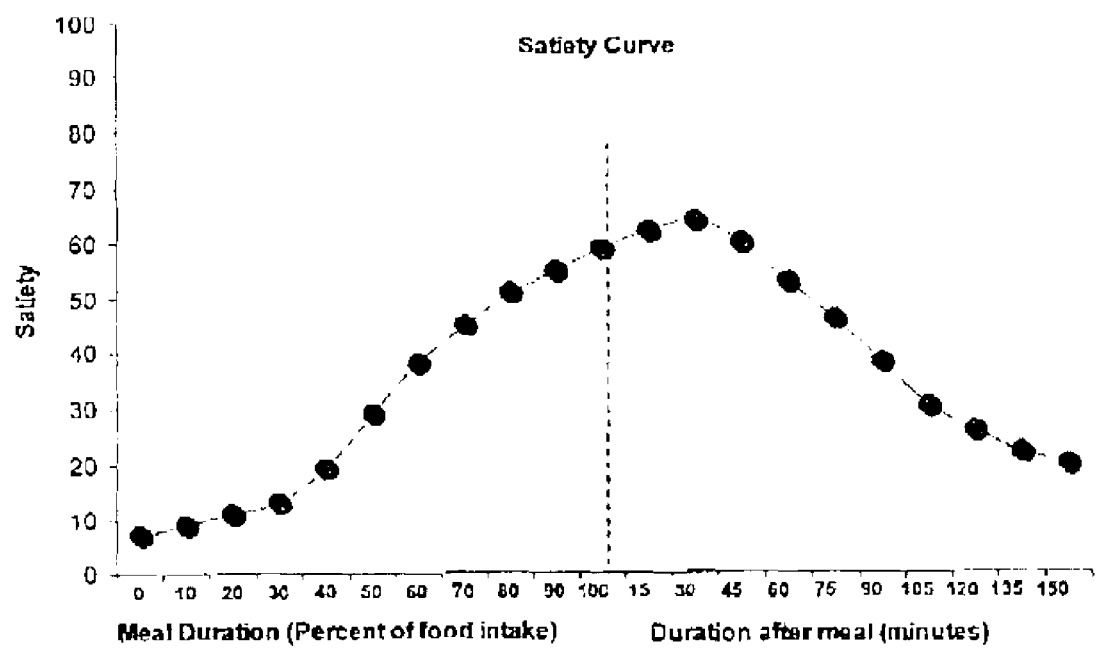
FIG. 2 schematically illustrates a diagram of satiety during intake of food and satiety decreasing after food intake.

FIG. 2 illustrates a diagram measuring satiety during a meal to the left of the broken line boarder, the boarder divides a 100 percent food intake from a measurement of satiety after food intake in the same diagram. The diagram in FIG. 2 makes it clear that neither food intake related to satiety nor the duration of satiety after food intake is a linear function. The diagram can be used to show or convince a person that registers strange ratings (in relation to normal) that it is impossible for instance to rate satiety to very weak 15 minutes after having rated satiety to maximal. Of course scientists are helped to draw conclusions of registered ratings in relation to the type of eating disorder and the number of people that register out of diagrams like that shown in FIG. 2. There is no absolute knowledge or formula of what guides the notion of satiety more than that it is biologically conditioned. Hence, registered data from a vast population of users of the device would answer many questions.

Figure 3:
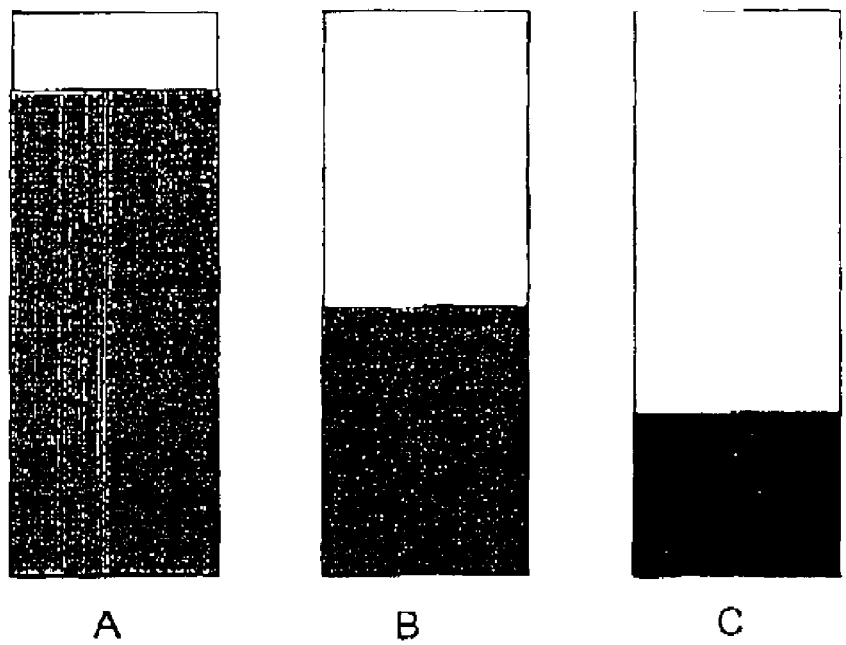
FIG. 3 schematically illustrates an embodiment of a floating alert indicating when it is suitable for a person to eat.

In FIG. 3 one embodiment of a floating color scale is depicted, the person rating her/his satiety is provided a recommendation of when to take the next meal. For example when a person starts to rate, the first satiety rating would probably be high, close to maximal. This could be represented by a less bright green color (A in FIG. 3) to indicate that it is not "green" to take your next meal yet. As time passes and the ratings of satiety become lower the green color gets brighter (B to A in FIG. 3) in a floating manner, which indicates that it is more and more acceptable to eat.

This floating color could in another embodiment of the invention be combined with at least two colors, for example red and green. The embodiment could begin with a very bright red color for high ratings of satiety meaning "do not eat". As satiety declines the red color becomes less and less bright to a turning point, for example, at the rating moderate satiety in the scale, where the color switches to a less bright green color meaning "it is not entirely forbidden to eat", whereby the green color gets greener and greener saying "please do eat".

In a further embodiment multiple colors could be used to illustrate the floating color scale such as for instance red, yellow, and green similar to the color combination of traffic lights, which are familiar to most persons.

Additionally, the floating colors could be combined with flashing icons and/or sound or the like on the screen 14 telling a user when to eat. In a very simple embodiment no color scale is provided but only a sound and/or flashing icon to tell a user to eat.

It is appreciated that the scale 18 could be reversed in its appearance on the screen 14.

Clinical studies mentioned have shown that an obese person can lose approximately 0.2 kg a week by using the device of the present invention to guide when to eat.

While the Mandometer® trademark of the device disclosed in U.S. Pat. No. 5,817,006 to Bergh et al, is effective in giving feedback regarding satiety during meals, the SatietyMeter or device 10 of the present invention allows feedback to be given regarding satiety levels between meals. Since patients often say they eat because they are bored or because they have nothing else to do, this kind of information makes it possible for patients to stop eating between meals. A patient carries a SatietyMeter of the present invention in her/his pocket and the unit signals every 15 minutes between meals to elicit an estimate the level of satiety. If the patient rates her/his level of satiety as weak, or very weak, she/he would be expected to eat. However, if the satiety estimate is average, or above average, the patient is expected to refrain from eating. The SatietyMeter thereby makes the patient consider if she/he actually is hungry before eating. Patients learn to identify those times between meals when they eat for reasons other than hunger.

As a patient reduces her/his body weight, the stomach adapts and the feeling of fullness is experienced earlier during the meal. Thus, the perception of hunger and satiety can be modified with Mandometer® and the SatietyMeter of the present invention to establish new patterns of behavior. A change in environment is often necessary to eliminate environmental cues that maintain old habits with regard to food intake and activity and it is often easier to eliminate old behaviors in a new environment than in the one in which it was developed. Starting the program while staying with a relative or friend over a weekend may help these new behaviors to be established.

Clinical Test

A pilot trial with nine morbidly obese children (BMI at least 35 kg/m$^2$) is ongoing at the Department of Pediatric Endocrinology, Bristol Royal Hospital for Children. University of Bristol, England. The children are 12–18 years old and they have been treated unsuccessfully with the standard of care for at least one year. All but one have responded to the Mandometer® treatment, with a total weight loss ranging from 2–9 kg in up to three months of treatment. They feel "they are not on a diet" and have "stopped snacking" between meals. "The SatietyMeter makes me think that I don't have to eat" is another comment repeatedly heard. Their eating rate has decreased and the feeling of fullness starts earlier in the meal than it did before treatment. There is also an improvement of their self-esteem, they have started to socialize with peers, they watch less TV (from 6 to 2 hr/day), and they have increased their physical activity.

Figure 4:
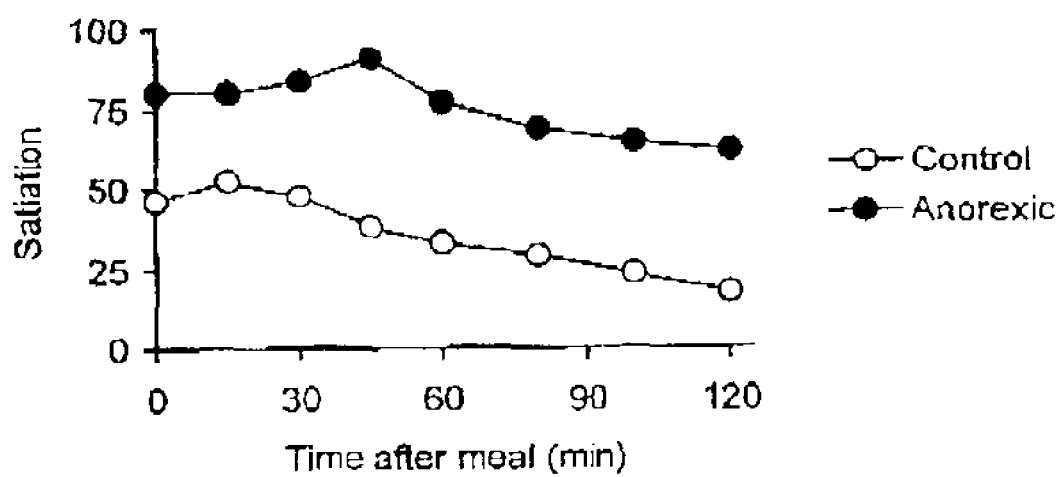
FIG. 4 presents graphs of satiation as a function of time after meals for groups of both healthy and anorexic women.

FIG. 4 shows in a diagram that the satiety ratings of healthy women decline after a meal. By contrast, anorexic women rate their satiety as much higher after a meal than healthy women despite eating less food and they also continue to rate their satiety as higher during a two hour period after the meal.

FIG. 4 depicts satiation in 24 control women (19.8, range: 18–21, years old) and 5 anorexic women (16, range: 14–17, years old) at different times after intake of 282 (range: 154–452) and 111 (range: 54–154) g food in 8.6 (range: 5.3–12) and 16.6 (range: 14–21) min, respectively. Values are medians. Measures of variability are omitted to facilitate visual inspection. The verbal expressions on the satiety curve are in accordance with the present invention: none at all, very weak, etc corresponding to numerical values: 0–100. The scientific test data of FIG. 4 has not yet been made available to the public.

The present invention has been described through examples and embodiments not intended to limit the scope of the invention. Hence, the invention is determined through its attached set of claims, which in addition suggests further embodiments to a person skilled in the art.

We claim:

1. A computerized handheld substantially pocket size device for satiety registering and response to satiety, utilized in aiding a person, in a controlled manner, to appreciate when to eat, comprising in-/output means, electronic memory, and a display screen, further comprising:

a modified Borg type scale representing ratings of satiety on said screen;

a means for alerting said person to register through said input means felt satiety on said scale in a predetermined number of intervals following a food-intake; and at least one of an indicating and an alerting means acknowledging when food-intake is accepted for said person, thus aiding said person in a smooth long term dieting contradicting extreme excessive short term dieting.

2. A device according to claim 1, wherein said scale at least partially is partitioned in incremental steps linguistically expressed in terms ranging from approximately no satiety to a maximum of satiety or in terms equivalent to those, said device also being used to register felt satiety during a meal.

3. A device according to claim 1, wherein said indicating means is a floating color scale within said modified Borg type scale indicating from less brighter colors to brighter colors after registering a felt satiety, indicating when eating is more and more recommended.

4. A device according to claim 1, wherein said indicating means is a floating color scale within said modified Borg type scale indicating from brighter colors to less brighter colors after registering a felt satiety, indicating when eating is more and more recommended.

5. A device according to claim 1, wherein said indicating means is a floating color scale within said Borg type scale indicating from less brighter colors to brighter colors after registering a felt satiety, and a switch switching at a predetermined brightness to a floating color scale within said modified Borg type scale indicating from brighter colors to less brighter colors after registering a felt satiety, indicating when eating is more and more recommended.

6. A device according to claim 1, wherein at least one of said alerting means generates a vibration to said device.

7. A method for satiety registering and response to satiety utilizing a computerized handheld substantially pocket size device in aiding a person, in a controlled manner, to appreciate when to eat, comprising in-/output means, electronic memory, and a display screen, comprising:

employing a modified Borg type scale representing ratings of satiety said screen;

alerting said person to register through said input means felt satiety on said scale in a predetermined number of intervals following a food-intake; and at least one of indicating and alerting when food-intake is acknowledged for said person, thus aiding said person in a smooth long term dieting contradicting extreme excessive short term dieting.

8. A method according to claim 7, wherein said scale at least partially is partitioned in incremental steps linguistically expressed in terms ranging from approximately no satiety to a maximum of satiety or in terms equivalent to those, said device also being used to register felt satiety during a meal.

9. A method according to claim 7, wherein said indicating action comprises using a floating color scale within said modified Borg type scale indicating from brighter colors to less brighter colors after registering a felt satiety, indicating when eating is more and more recommended.

10. A method according to claim 7, wherein said indicating action comprises using a floating color scale within said modified Borg type scale indicating from less brighter colors to brighter colors after registering a felt satiety, indicating when eating is more and more recommended.

11. A method according to claim 7, wherein said indicating action comprises using a floating color scale within said Borg type scale indicating from less brighter colors to brighter colors after registering a felt satiety, and a switch switching at a predetermined brightness to a floating color scale within said modified Borg type scale indicating from brighter colors to less brighter colors after registering a felt satiety, indicating when eating is more and more recommended.

12. A method according to claim 1, wherein at least one of said alerting actions comprises generating a vibration to said device.

* * * * *